T. & J. W. Wise,
Sheep Shears.
N° 55,569. Patented June 12, 1866.
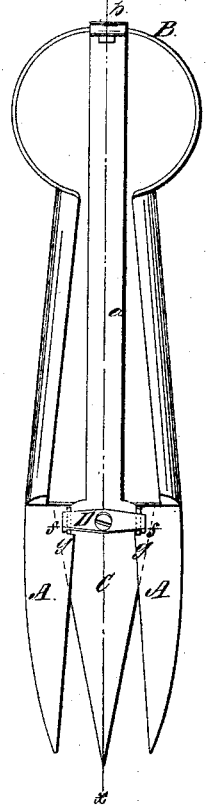
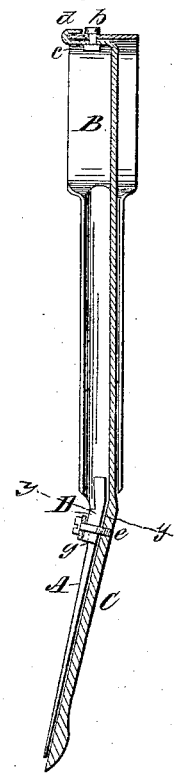
Witnesses:
Inventors:
Tobias Wise
Jn° W Wise

UNITED STATES PATENT OFFICE.

TOBIAS WISE AND JOHN W. WISE, OF ADRIAN, MICHIGAN.

IMPROVEMENT IN SHEEP-SHEARS.

Specification forming part of Letters Patent No. 55,569, dated June 12, 1866.

*To all whom it may concern:*

Be it known that we, TOBIAS WISE and JOHN W. WISE, of Adrian, in the county of Lenawee and State of Michigan, have invented a new and useful Improvement in Sheep-Shears; and we do hereby declare that the following is a full, clear, and exact description thereof, which will enable others skilled in the art to make and use the same, reference being had to the accompanying drawings, forming part of this specification, in which—

Figure 1 is a plan or top view of our invention. Fig. 2 is a longitudinal central section taken on the plane of the line $x\,x$, Fig. 1. Fig. 3 is a cross-section taken on the line $y\,y$, Fig. 2.

Similar letters of reference indicate like parts.

Our invention consists in constructing a pair of sheep-shears with a central blade having a cutting-edge on each side and arranged in such relation to each of the ordinary blades of a pair of sheep-shears that they will each rest upon and cut against the respective edges of the central blade, which is stationary.

It also consists in attaching a guard with stops at its ends, which strike against lugs on the top of the blades and prevent the two blades from opening too far, yet allowing them to open a proper distance to do their work properly.

A A designate the two blades of an ordinary pair of sheep-shears, and B the spring for operating them.

C designate what we term the "central" blade, and this constitutes the principal feature of our invention. This blade in the present instance has a long shank, $a$, whose upper end is connected to the bow of the spring by a bolt, $b$, passing through a bend in the said shank, as shown in Fig. 2, where it will be noticed that the shank is bent at right angles to itself, $c$, and its end turned over, $d$, so as to overlap the edge of the spring, a notch being cut into the edge of the spring to admit of a ready adjustment of the said end of the shank to its proper place, as well as to prevent its slipping laterally. The bolt $b$ is a screw-bolt, and carries a nut for tightening it as well as to permit the central blade with its shank being detached from the shears should occasion require. The face of the blade C is beveled from its center to its edges, and the edges are sharpened, so that when the two blades A A are forced upon it a true and perfect cut will be insured. The said central blade, C, extends a short distance beyond the points of the ordinary blades, and has its point beveled off, so as to permit of its gliding along, like a sled-runner, without any danger of its points or the points of the common blades sticking into the sheep.

D is a strip of metal answering the purpose of a guard. It is secured to the central blade, C, near its shank, $a$, by a screw, $e$, passing through it and into the central blade. The two ends of this guard are bent over, or have lips formed upon them, as shown at $f\,f$ in Fig. 3, and these lips are arranged to strike against lugs or stops $g\,g$ upon the face of each blade A. This guard not only prevents the two blades A A from springing out too far, (they being arrested by the stops or lugs $g\,g$ coming in contact with the lips $f\,f$ on the strip D, Fig. 3,) but it serves as a means for causing the two ordinary blades to press more heavily or lightly upon the central blade, according as to the force with which it is screwed down to the blade C, and hence increase the cutting capacity of the shears for all manner of wool or tangled, knotted, or straight, or the toughest tag-locks, to cut which latter it is necessary that the two blades bind or press against each other to a very great degree. The screw which holds the said guard down serves as a means for preventing the blades from coming so near together as to overlap each other.

From the above description it will be observed that both the ordinary blades cut against the central blade, and not against each other. The central blade rests upon the skin of the sheep, and glides along, and effectually prevents the ordinary blades A cutting the skin of the sheep or their points sticking in the same; and it may be remarked that it is a difficult matter to avoid this in "wrinkly" sheep. The central blade, by reason of its extended beveled end, acts like a runner, crowding away every obstacle and throwing the points of the shears over the wrinkles, so as to avoid cutting the sheep.

We have practically tested a pair of shears constructed according to our invention, and find that the operation of shearing sheep can be performed more expeditiously (the danger of cutting the sheep being obviated) the operator can work faster, and more effectually than by any shears hitherto introduced into the market.

What we claim as new, and desire to secure by Letters Patent, is—

1. The employment, in a pair of sheep-shears, of a central blade, C, arranged in such relation to the two blades of an ordinary pair of sheep-shears as to effect the object herein specified.

2. The combination of the guard D with the central blade, C, and stops $g$ $g$ on the blades A A, substantially as specified.

3. Attaching the shank of the central blade by a screw and nut, or an equivalent thereof, which will permit of the said shank, and the central blade also being removed from the shears at pleasure.

TOBIAS WISE.
JOHN W. WISE.

Witnesses:
J. W. HELME,
C. T. BATEMAN.